US006371881B1

(12) United States Patent
Garcia Benitez et al.

(10) Patent No.: US 6,371,881 B1
(45) Date of Patent: Apr. 16, 2002

(54) VARIABLE CONTINUOUS TRANSMISSION SYSTEM

(76) Inventors: Francisco de Asis Garcia Benitez, Monzon 42-4A, 41012 Seville (ES); Juan Gutierrez De Cepeda, Juan Sebastial Elcano, 4, 41011 Seville (ES); Pedro Madroñal Martinez, c/ P. Capuchinos, 6D, Jerez de la Frontera, 11405 Cadiz (ES); Gonzalo Campillo Arrabal, C/ Ronda de Capuchinos, 4 41003-Seville (ES)

( * ) Notice: Subject to any disclaimer, the term of this patent is extended or adjusted under 35 U.S.C. 154(b) by 0 days.

(21) Appl. No.: 09/508,919

(22) PCT Filed: Sep. 18, 1998

(86) PCT No.: PCT/ES98/00254

§ 371 Date: Mar. 17, 2000

§ 102(e) Date: Mar. 17, 2000

(87) PCT Pub. No.: WO99/15812

PCT Pub. Date: Apr. 1, 1999

(30) Foreign Application Priority Data

Sep. 19, 1997 (ES) .............................................. 9701972

(51) Int. Cl.[7] .............................................. F16H 29/16
(52) U.S. Cl. ..................... 475/269; 475/16; 475/297; 475/346
(58) Field of Search .......................... 475/16, 269, 297, 475/339, 346

(56) References Cited

U.S. PATENT DOCUMENTS

| 1,769,614 A | * | 7/1930 | Anglada | 475/16 |
| 1,847,040 A | | 2/1932 | Roth | 475/185 |
| 2,178,784 A | * | 11/1939 | Ewart | 475/16 |
| 3,087,355 A | | 4/1963 | Bassereau | 475/16 |

(List continued on next page.)

FOREIGN PATENT DOCUMENTS

| FR | 806831 | 12/1936 |
| GB | 465110 | 4/1937 |
| WO | 95/06829 | 3/1995 |

OTHER PUBLICATIONS

Fitz, Frank A., "The Epilogics infinitely variable transmission," *Automotive Technology*, pp. 215–220, 1992.
Puttré, Michael, "Continuously Variable Transmissions," *Mechanical Engineering*, pp. 64–67, 1991.
Fitz, Frank A. and Paul B. Pires, "A Geared Infinitely Variable Transmission for Automotive Applications," Society of Automotive Engineers paper presented at the SAE International Congress & Exposition, pp. 1–7, 1991.
Fitz, Frank A. and Paul B. Pires, "A High Torque, High Efficiency CVT for Electric Vehicles," Electric Vehicle Design and Development SP–862 paper for Society of Automotive Engineers, ISBN: 1–56091–126–3, pp. 111–116, 1991.

*Primary Examiner*—Sherry Estremsky
(74) *Attorney, Agent, or Firm*—Ladas & Parry

(57) ABSTRACT

The system is comprised of three sub-systems. The first sub-system has an actuation lever (P) which can rotate about an axis (E1) to displace excentrically the Second Sub-system with respect to the Third by a predetermined angle circumferentially about a toothed wheel (R1), a toothed fluted wheel (R2) or fluted cross or cross with sliding torkes, and gear carrying shafts passing therethrough. The grooved wheel (R2) rotates a fixed transmission relationship with respect to the rotation of the input shaft. The second sub-system transforms and divides the input power for the primary shaft into powers which are transmitted to various secondary shafts (E3, E4) characterized by oscillating angular speeds and torkes. The third sub-system composes the powers transmitted by the secondary shafts by means of a epicyclic train (T1) into an output power. The resulting output motion is proportional to the eccentricity angle of the first sub-system with respect to the third sub-system. Application to the automotion industry and to any other industry which requires a continuous regulation of the speed and of the torke provided by a power unit.

17 Claims, 10 Drawing Sheets

U.S. PATENT DOCUMENTS

| | | | | |
|---|---|---|---|---|
| 4,817,464 A | * | 4/1989 | Korban et al. | 475/14 |
| 4,850,248 A | * | 7/1989 | Korban et al. | 475/14 |
| 4,983,151 A | | 1/1991 | Pires | 475/170 |
| 5,108,352 A | * | 4/1992 | Pires | 475/16 |
| 5,226,859 A | * | 7/1993 | Pires | 475/170 |
| 5,334,115 A | * | 8/1994 | Pires | 475/170 |
| 5,632,703 A | * | 5/1997 | Wilkes et al. | 475/339 |
| 5,951,430 A | * | 9/1999 | Kobayashi | 475/339 |
| 5,997,427 A | * | 12/1999 | Fenton | 475/170 |

* cited by examiner

VARIABLE CONTINUOUS TRANSMISSION SYSTEM

DESCRIPTION

The present invention is a new prototype of a continuously variable transmission system. It will be used as the gear box in automobiles, motorcycles or any other self-propelled vehicle requiring a variable transmission ratio between the power plant and the live axle.

This system offers noteworthy improvements in the theoretical concept and practical undertaking of existing transmission systems based on the same mechanical principles. These improvements consist in a simplified design and a broader generalization of the kinematics design.

This invention has practical applications in all systems requiring continuous regulation of rotational speed and torque supplied by a power plant.

This invention pertains to section F. Mechanics, in accordance to C.I.P.

BACKGROUND

Internal combustion engines are the most widely used power plant for automobiles and in self propelled vehicles in general. Their main advantage is the high specific power (power per unit weight) which they are capable of supplying, as well as their high autonomy. They do, however, have one disadvantage: the limited range of speeds at which they are able to produce high enough power. In general, they only produce sufficient power for automotive use between approximately 1000 and 6000 rpm. Moreover, the power output differs from one regime to another, the maximum power being five or six times that found at idle speeds.

If the transmission ratio between the engine and the wheels of the vehicle were fixed, the whole range of speeds required by the vehicle would not be encompassed. In fact, a relation which provides an adequate minimal speed (e.g. 10 km/hour) yields an inappropriate maximum speed (60 km/hour). Analogously, a fixed relation which provides a commercially acceptable maximum speed (e.g. 210 km/hour) would yield an unacceptable minimum speed (35 km/hour). This was the main reason leading to the incorporation of a variable ratio transmission system, generally known as a gear box.

Conventional gear boxes allow for selection among a discrete range of transmission ratios, usually between 4 and 6 for passenger vehicles, a few more for commercial and 4-wheel drive vehicles and buses, and double and triple for agricultural and construction vehicles. Better use is made of the engine with these boxes. Any value of vehicle speed can be reached while maintaining relatively high power output, within an appropriate range of speeds. However, these transmissions are not ideal, since they are only capable of providing maximum engine power for certain values of vehicle speed. Continuously variable transmission appeared in an attempt to evade this inconvenience; this technical solution being capable of providing any ratio between vehicle speed and engine angular speed. In this way the engine could be kept rotating in the most convenient regime no matter what speed the vehicle were traveling at. In principle, this regime could be the one of maximum power, but the maximum torque regime, and the minimal specific fuel consumption regime, are also of interest.

The present development of transmission systems can be classified as follows:

Fixed ratios. These use sets of spur gears which mesh giving way to a transmission ratio which depends on the diameters of the gears involved. The ratios vary depending upon the wheels which mesh and intervene in the transmission chain. This system requires clutches in order to carry out the ratio selection. These selections can be made manually or automatically, the second case requiring a hydraulic system, called a hydraulic torque converter, as well as planetary gear sets. Electromechanical clutch systems have also been used for this purpose.

Continually variable ratio. In this scope there are a wide variety of ideas and practical developments. The different types over time can be classified as:

Hydraulic systems. They use variable displacement pumps.

Systems based on belt transmissions. From a practical point of view, the Transmatic Van Doorne system is one of the most widely used. It is based on a belt transmission between pulleys which can vary their effective diameter, thus changing the transmission ratio. Some of the drawbacks of this type of system lie in its excessive volume and low capacity of power transmission. The latter is due to the system being based on friction. Other configurations worth mention are those developed from the work of Fouillarion, the Kumm mechanism, the PIV -Reimers, Variomatic, etc.

Systems based on wheels in contact. Known as traction drives. They basically consist of two wheels in contact with their perpendicular axis which vary the transmission ratio as one wheel moves away from the axis of the other. This system is also based on friction and it requires pure rolling contact. The most noteworthy mechanisms are NTD (Nutating Traction Drive) by Vadetec, Vadetec NT-XA2, Hayes CVT toroidal, Perbury/BTG toroidal CVT, the developments by Excelermatic, Forster, Epicyclic by Jaguar and Torotrak, among others.

Oscillating systems. These are completely mechanical transmissions which transform a rotating movement into an oscillating one. This is latter rectified in the kinematic chain by converting it back to a rotational motion. They are known as ratcheting drives. They have a few advantages: they do not involve friction elements, they do not need clutches, the transmission ratio can be varied with a simple linear actuator without transmission interruptions and they are smaller, lighter and cheaper to manufacture than an automatic gear box. Some of the first inventions of this type of mechanism were the R. V. R, Dietrich and LCB systems. One of the most recent practical realizations is the system developed by Epilogics Inc. Called infinitely variable transmission (IVT), it is the object of the P. Pires patent.

ADVANTAGES OF THE INVENTION

The advantages of the system which is the object of this patent can be synthesized as follows:

Completely mechanical transmission and, therefore, high mechanical efficiency.

Absence of friction elements which reduce the efficiency of torque transmission.

The transmission ratio continuously varies linearly from 0 to 1. This ratio may be varied with an extra multiplying or dividing system.

There is no need to interrupt the power flow (via a clutch) to vary the transmission ratio from a null value to a non-null value or from a non-null value to zero.

The above characteristics make the system especially interesting from an industrial and commercial point of view.

It has an immediate application in the automobile industry, as well is in industrial applications requiring speed and torque variations The main differences between this system and the system which is technologically closest to it, the IVT mechanism by Epilogics U.S. Pat. No. 4,983,151 A), are:

There are no elbow members to transform the rotating input into oscillating motion.

There is one sole epicyclical mechanism and, therefore, there is no direct transmission through a secondary axis from the power plant to be added to the output of the rectifying mechanism.

TECHNICAL DESCRIPTION

The aim of this patent is the design of a torque-velocity converter which improves upon current oscillating systems which conform the state of the art up to the present. The system, an outline of which appears in FIG. 1, allows for the transformation of the input torque (Me) at angular input speed $\omega e$ into another output torque (D) at angular speed $\omega s$. This transmits the power entering through the input axle to the output axle, this transmission of power being affected by the mechanical efficiency of the system.

The system is made up of three sub-systems which will be described below:

Torque-Speed Variation Sub-system. Its aim is to vary the relative position of the Transformation and Division Sub-system with respect to the Compounding Sub-system.

Transformation and Division Sub-system. This mechanism transforms and divides the power entering through the primary axle, characterized by torque Me and angular speed $\omega e$, at power transmitted to various secondary axles, characterized by oscillating torques and angular speeds.

Compounding Sub-system. This mechanism compounds the power transmitted by the secondary axles, using an epicyclic gear train, into an output power characterized by torque Ms and angular speed $\omega s$.

DESCRIPTION AND WORKING PRINCIPLE OF AN ACTUAL MODEL

Description

The invention will now be described based on preferred actual model and making reference to the adjoined technical drawings in which.

The system consists of an axle (E1) which transmits the rotational motion originating from a power plant, unrelated to this invention, through spur gear R1 to spur gear R2. Spur gear R2 is concentric and fixed to axle E2. It has slots which are crossed by axles E3 and E4. There may be a few units like these (four of each type in the model being described). Axles E3 and E4 necessarily follow a fixed circular path, the center of which coincides with the center of crown C1. The gears R3, each of which is fixed on to its axle, are permanently meshed with crown C1. In order for axles E3 and E4 to maintain this path, their ends are forced to move inside the grooves of rings A1 and A2. An alternative configuration would be to place geared crown C1 with external teeth. Crown C1 is fixed to the housing of the mechanism (not shown in FIGS. 1 and 2).

Axles E3 and E4, on the opposite end from spur gears R3, have spur gears R4 and R5 mounted on free wheels. This may be done directly, as in the case of the E4 type axles, or with intermediate axles (E5), as in the case of the E3 type axles. The free wheel labeled L1 and L2 are mounted so as to work in opposite directions: L1 transmits torque in opposite direction than L2 and vice versa.

Figure 3:
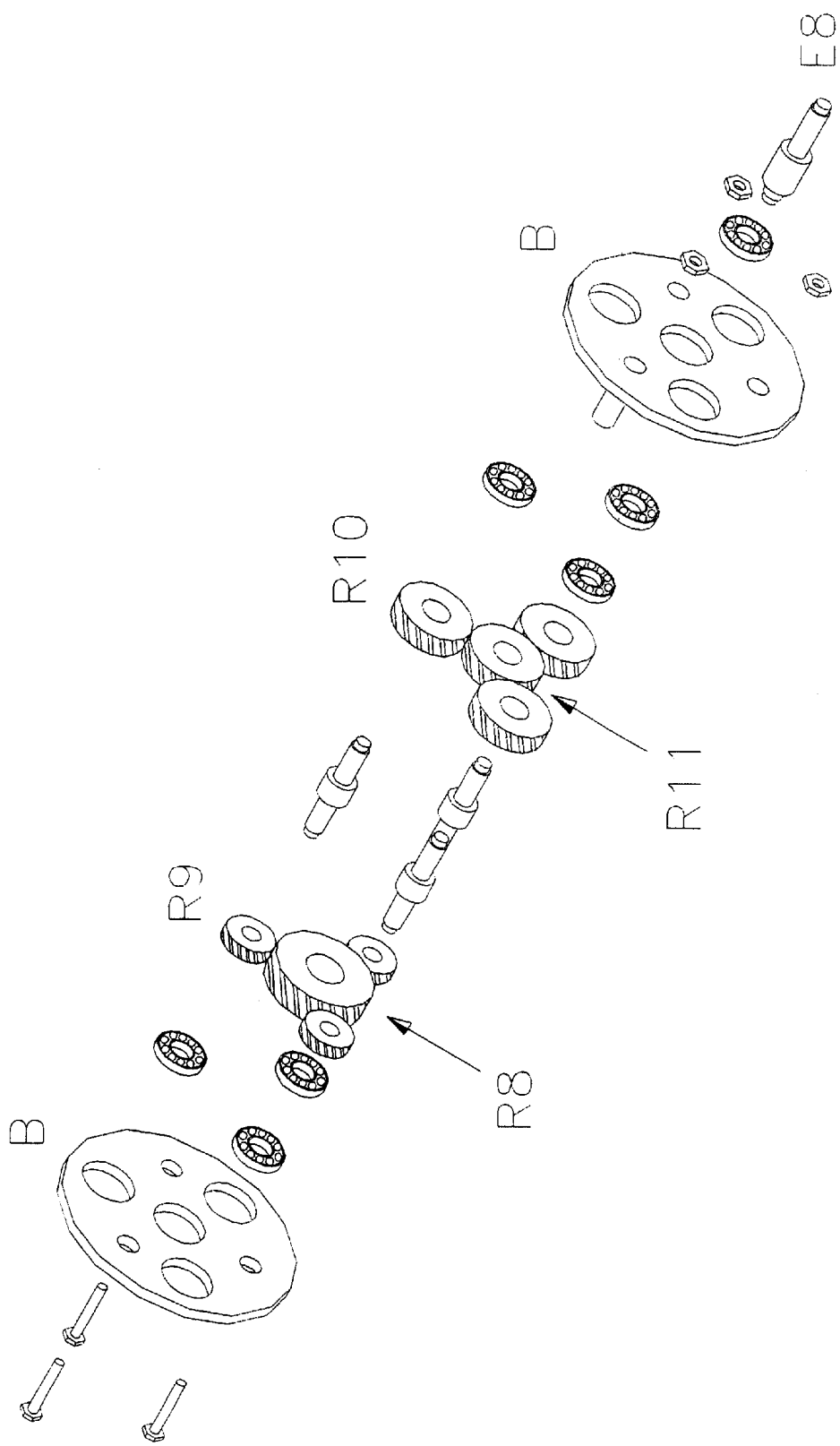
FIG. 3 is a three-dimensional blow-up of one of the sub-systems, particularly the one labeled T1 in FIG. 2.

The motions generated by the R4 and R5 type gears are transmitted to spur gears R6 and R7, respectively, and are driven to an epicyclic gear train T1 (blown up in FIG. 3) through axles E6 and E7. The compounding of both motions, and the torques transmitted, are extracted by axle E8. An actual model of the epicyclic gear train, represented in FIG. 3, is composed of the input axle fixed to planet spur gear R8, which meshes with the planet carrier axles that hold spur gears R9 and R10. These axles, positioned on the housing of epicyclic gear train B, transmit the motion of the housing which is fixed to axle E7. The motion transmitted by spur gear R10 to spur gear is R11 is extracted by axle E8.

Part P, called the control lever, revolves concentrically around axle E1 thereby displacing axle E2. This makes it eccentric with respect to axle E6, therefore they are no longer coaxial. This displacement also pulls along spur gear R2, thereby modifying the relative position between axles E3 and E4. The position of axle E1 with respect to the housing is fixed, only allowing for rotation.

The whole system is lubricated and enclosed within its housing. Although they are not described, there are ball bearings, needle bearings, and brass bushings which minimize possible friction.

Working principle

The working principle of the mechanism will be described below.

The transmission ratio between output axle E8 and input axle E1 depends on, among other geometric factors of the mechanism, the angle formed by the planes defined by the centers of the E1–E2 and E1–E6 axles. Therefore, when this angle is zero, the transmission ratio is proportional to said angle, achieved by circumferentially rotating the lever P with respect to axis E1.

Power, characterized by input torque Me and angular speed $\omega e$, coming from an external source or power plant, is transferred to the system through axle E1 which transmits it to spur gear R2 through spur gear R1. Spur gear R2 pulls along the E3 and E4 type axles, which cross through the grooves designed for this purpose. Axles E3 and E4, when revolving around axle E2, since they have fixed spur gears (R3) on their ends which mesh with the gear fixed to the housing C1, rotate around their own axis. These rotations are transmitted to spur gears R6 and R7.

When lever P is displaced, forcing axle E2 not to be concentric to axles E6 and E7, the movement of axles E3 and E4 consists in revolutions around its axis, rotation around axle E2, and displacements along the slots in wheel R2. The compounding of these motions gives rise to sinusoidal rotations of axles E3 and E4 (with part of the cycle being clockwise and part counterclockwise).

The presence of free wheels on the ends of axles E3 and E4 allows only the desired part of the cycle to be transmitted to gears R6 and R7. These gears (R6 and R7) are driven by axles E3 and E5, respectively, with the higher eccentricity with respect to the axis of the epicyclic train which is coaxial to the axis defined as E6–E7. The higher the eccentricity the higher the velocity transmitted to gears R6 and R7.

The compounding of previous rotations in the epicyclic gear train T1 allows for a net rotation ωs in the output axle, as well as a net output torque Ms. The higher the eccentricity of the grooved wheel R2, the higher the output velocity with respect to the epicyclic train axis.

The output torque as well as the output angular velocity are proportionally related to the angle which defines the eccentricity between axis E2 and E6–E7, which are caused by the displacement of lever P. This occurs in such a way that when these axis are concentric, the transmission ratio is zero and increases as the eccentricity increases. This working principle gives the whole system its character of a continuously variable transmission mechanism.

Outline

Figure 4:
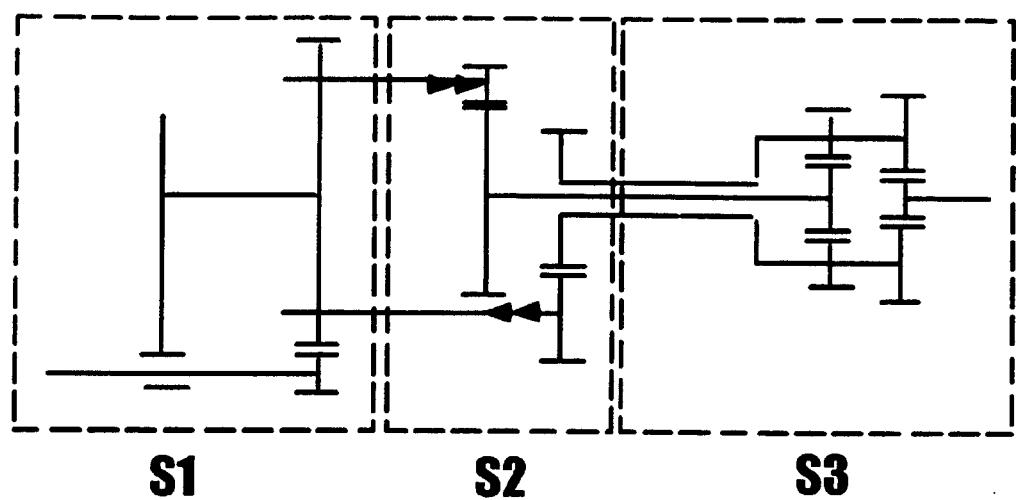

A schematic outline of the previous development is presented in FIG. 4. Standard symbols are used for the outlines of geared mechanisms, except for the case of the double arrow which represents a free wheel that transmits torque and rotation in one direction (clockwise/counterclockwise ) and not in the other (counterclockwise/clockwise) depending on how they are oriented (left-right/right-left) In FIG. 4, S1 identifies the Torque-Speed variation Subsystem, S2 identifies the Transformation and Division Subsystem and S3 the Compounding Subsystem.

ALTERNATIVE SYSTEMS

The actual model described in this report may be modified to obtain different designs of the three subsystems based on the same working principles. The different designs of the three subsystems are described below.

Alternatives for the Torque-Speed Variation Subsystem

Figure 5:
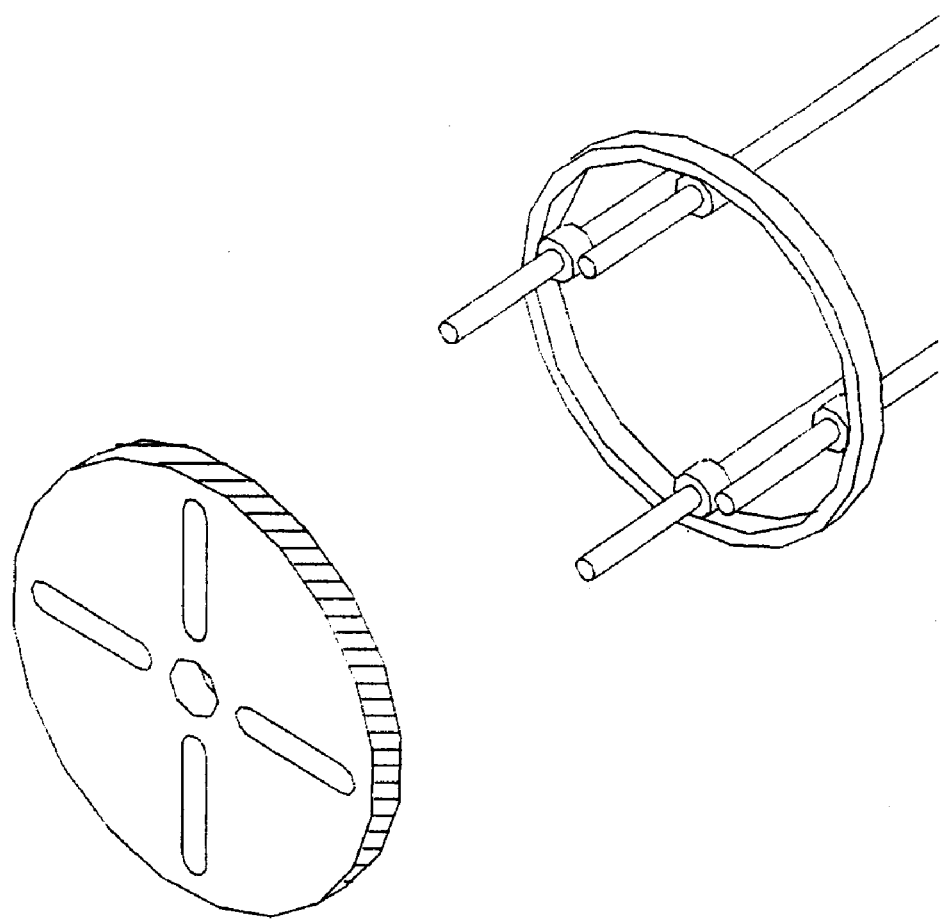

S1R: Control via a slotted wheel. Mechanism composed of a crown with external teeth and slots which guide axles with spur gears. FIG. 5 shows the slotted wheel and the axles that cross it.

Figure 6:
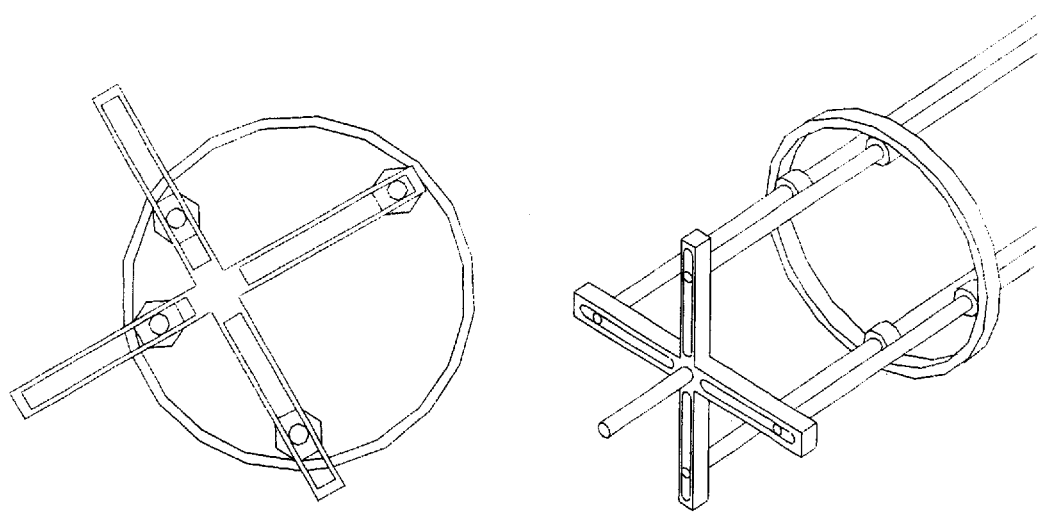
Figure 7:
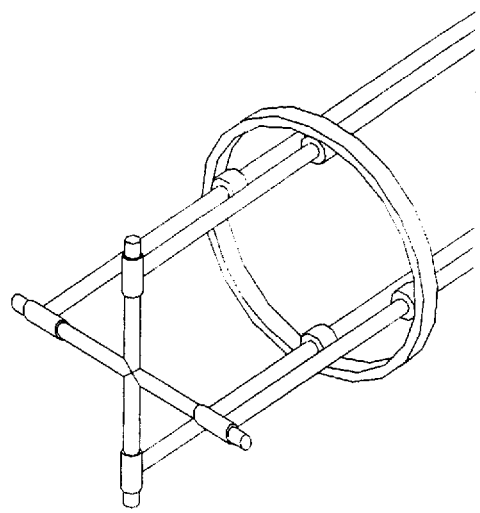

S1C: Control via a cross member. Mechanism composed of a crown with internal teeth, FIG. 6, or external teeth, which meshes with the spur gears of the axles which are guided by the cross member, or slide on the outside of the cross member via sliding pairs which are joined to the axles through revolute pairs, FIG. 7.

Alternatives for the Transformation and Division Subsystem

Figure 8:
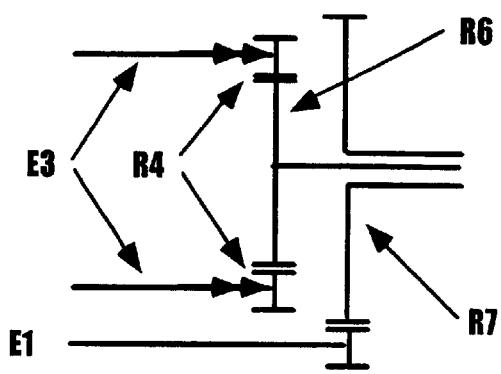

S2S: Simple Subsystem. Its schematic representation is shown in FIG. 8. It is composed of one or more axles (E3) which hold spur gears (R4) mounted on free wheels which transmit torque when rotate in one direction but not the other and that mesh with a spur gear (R6); the mechanism also transmits the input motion to a third spur gear (R7) through the primary axle (E1).

Figure 9:
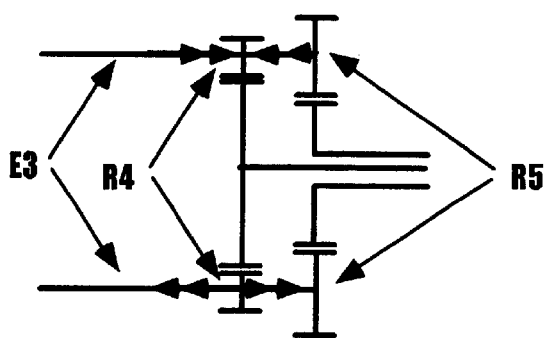

S2A: Re-used Subsystem. A schematic representation is shown in FIG. 9. It consists of a few axles (E3) (two or more) which hold two spur gears (R4 and R5) mounted on additional free wheels. One of them transmits torque when rotating in one direction and the other one when rotating in the opposite direction.

Figure 10:
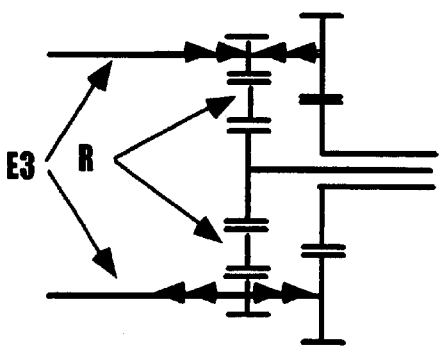

S2AI: Re-used Subsystem with Inversor. A schematic representation is shown in FIG. 10. It is similar to the mechanism called Re-used Subsystem, but differs from it in that there are spur gears (R) which work as motion inversors.

Figure 11:
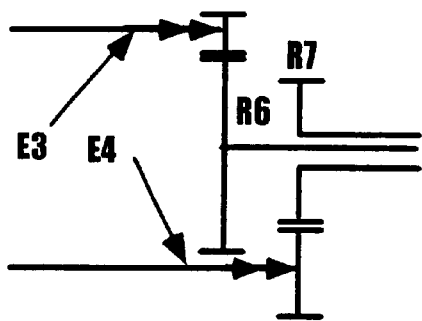

Compounding Subsystem. The components of this mechanism (FIGS. 11, 12 or 13) are a set of axles with an even or odd number of axles (E3) which mesh with spur gear R6 through spur gears mounted on free wheels, and a second set of axles (E4), with the same number of axles as the previous set, which mesh with a second spur gear (R7). The axles of the first set hold spur gears mounted on free wheels which transmit torque when rotating in a given direction, direction which may be the same or the opposite depending on the following two configurations:

S2CP. With free wheels which transmit torque in the same direction. A schematic representation is shown in FIG. 11.

Figure 12:
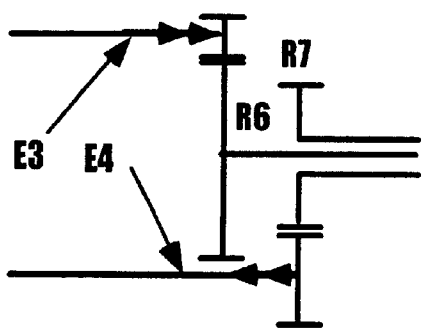

S2CN: With free wheels which transmit torque in the opposite direction. A schematic representation is shown in FIG. 12.

Figure 13:
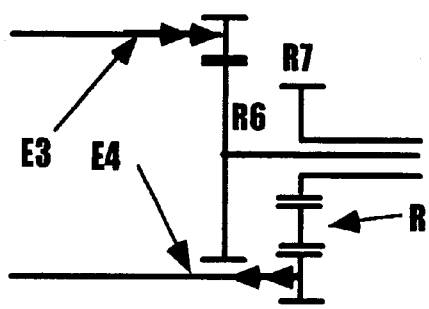

S2CI: Compounded Subsystem with Inversor. A schematic representation is shown in FIG. 13. It is similar to the mechanism called Compounded Subsystem, it differs from it in that there are spur gears (R) which work as motion inversors.

Alternatives for the Compounding Subsystem

Figure 14:
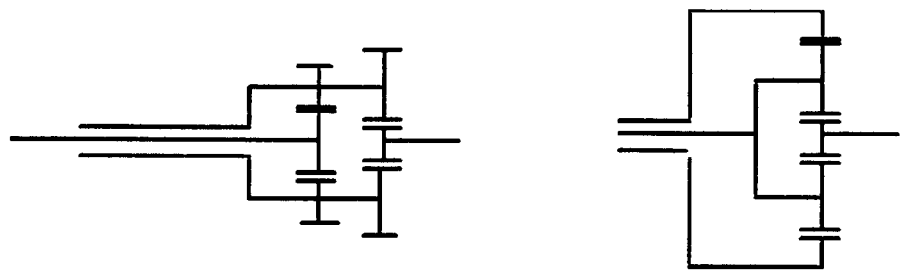

S3D: Direct Epicyclic Gear Train. The rotational input motions are those of the crown and the planet carrier, the rotational output motion is that of the sun gear. Two descriptions of this configuration are shown in FIG. 14.

Figure 15:
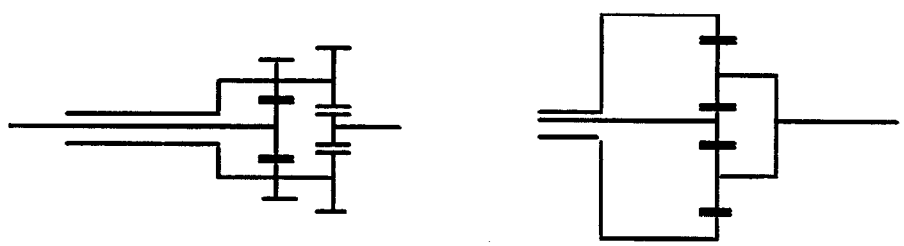

S3I: Inverted Epicyclic Gear Train. The rotational input motions are those of the crown and the sun gear, the rotational output motion is that of the planet carrier. Two descriptions of this configuration are shown in FIG. 15.

Figure 16:
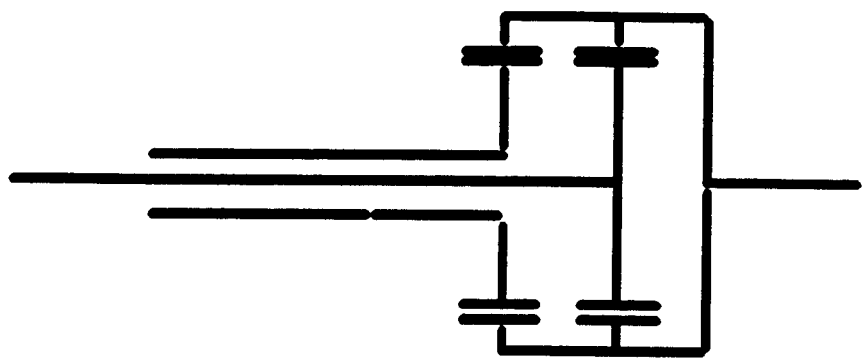

S3F. Differential train. It is a particular case of the epicyclic gear train. The rotational input motions are those of the two sun gears, the rotational output motion is that of the axis of its housing, FIG. 16.

Alternative Systems

Connecting all possible combinations of different subsystems results in different alternative systems. These combinations follow:

(S1R or S1C)+(S2S or S2A or S2AI or S2CP or S2CN or S2CI)+ (S3D or S3I or S3F)

with an even or odd number of type E3 or type E4 secondary axles.

Figure 17:
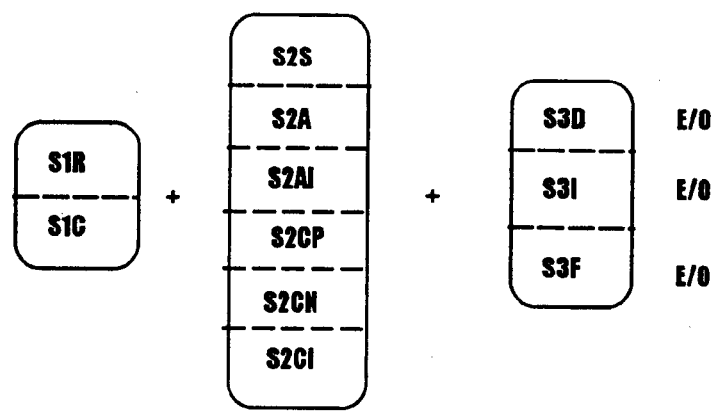

FIG. 17 shows the schematics of all possible combinations of the subsystems described in this document. These are the different variations of the invention for which a patent is requested. The nomenclature used throughout for the subsystems corresponds to the initials of the names (in Spanish) given to each subsystem in the preceding section. In the last column of the table, for each of the combinations described, the notation E, O, E/O has been used to indicate whether the number of axles type E3 or E4 is even (E) or odd (O).

Figure 1:
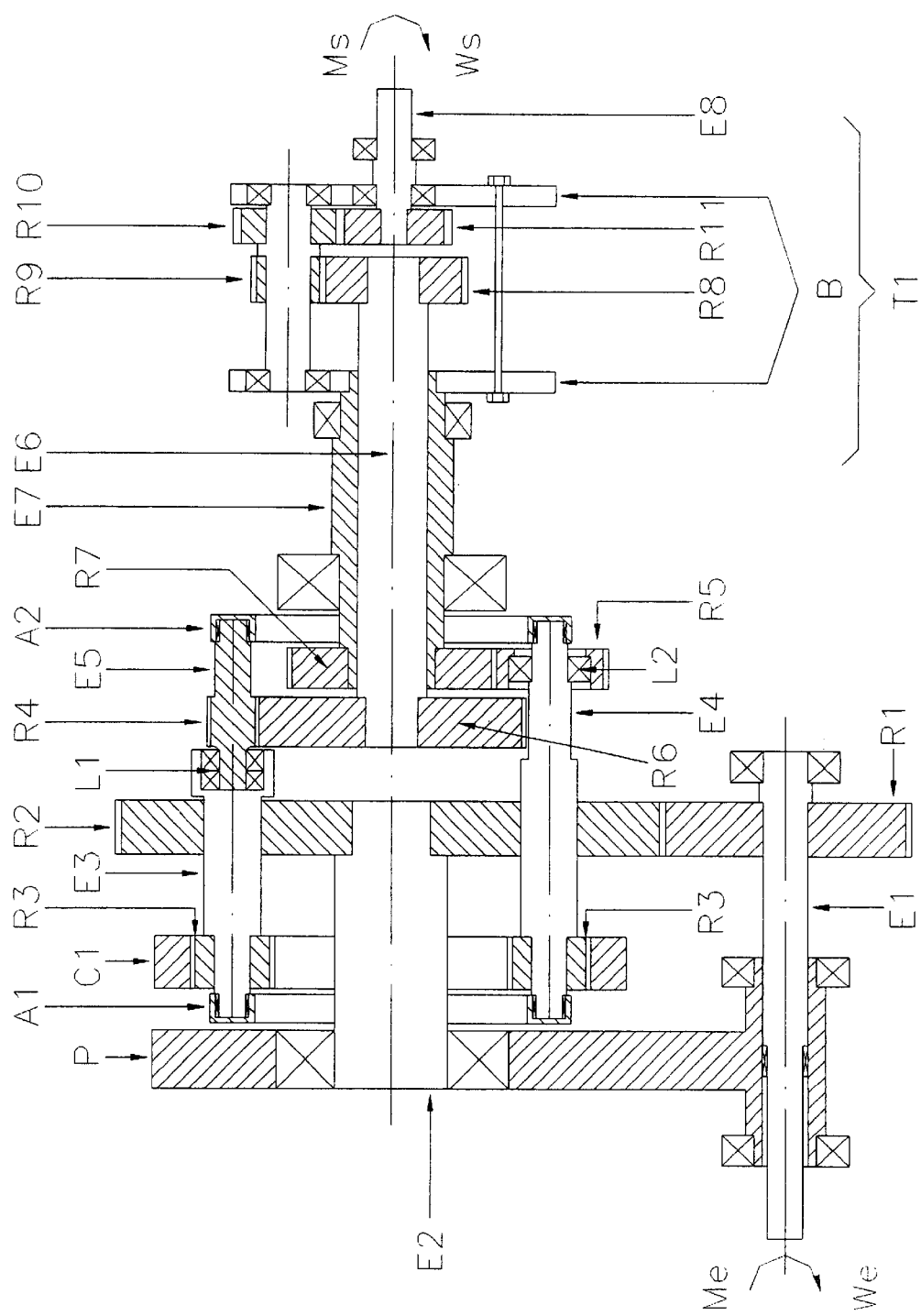
FIG. 1 is a sectioned view of the mechanism without its housing in order to get a better understanding of its inner workings.
Figure 2:
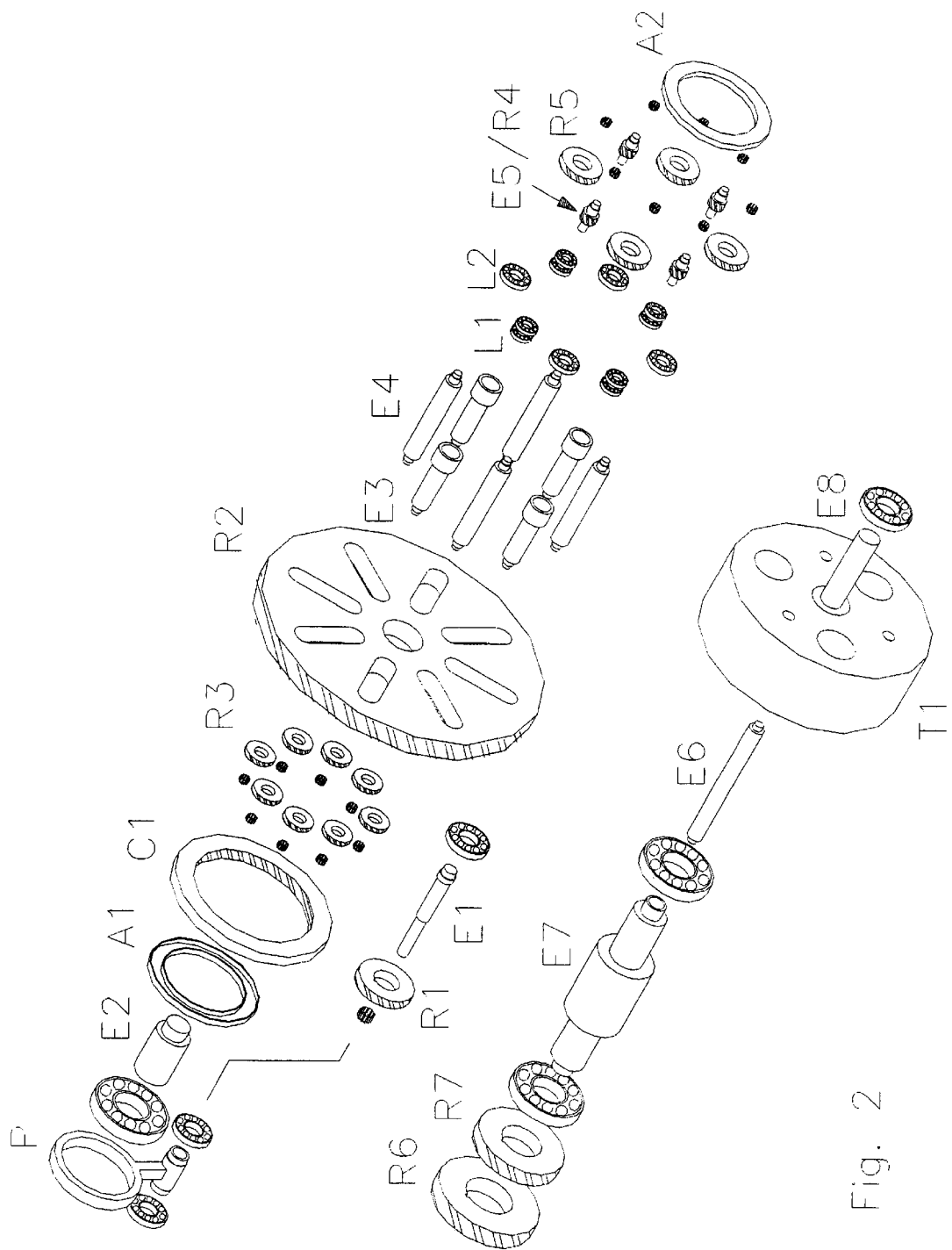
FIG. 2 is a three-dimensional blow-up of the mechanism showing its main components.

The actual model represented in FIG. 1 represents the following combination of subsystems:

S1R+S2CP+S3I with 4 secondary axles of type E3 and 4 of type E4.

SUMMARY

Continuously Variable Transmission System

It is composed of three subsystems:

The First Subsystem: Consists of a control lever (P), which by revolving around and axle (E1) eccentrically displaces the Second Subsystem (with respect to the Third) a given angle circumferentially around a spur gear (R1), a grooved wheel (R2) or a slotted cross member or cross member with translational pairs, and the axles which cross through it. The grooved wheel (R2) revolves with a fixed transmission ratio with respect to the rotational motion of the input axle.

The Second Subsystem: Transforms and divides the power entering through the primary axle into power transmitted to various secondary axles (E3, E4), characterized by oscillating torque and angular speeds.

The Third Subsystem: Compounds the power transmitted by the secondary axles, using an epicyclic gear train (T1), into output power. The resulting output motion is proportional to the eccentricity angle of the First Subsystem with respect to the Third.

It has applications in the automobile industry and in any other system requiring continuous regulation of the speed and torque supplied by a power plant.

What is claimed is:

1. A continuously variable transmission system arranged in a housing, said transmission system comprising:
    an input axle receiving input power from a power source, whereby the position of the input axle is fixed with respect to said housing;
    an input gear fixed on said input axle and engaged with an intermediate gear which is concentrically fixed on an intermediate axle and which has radial slots;
    first and second axles crossing said radial slots with one end fixed to gears engaged with a ring gear which is fixed to said housing;
    a first spur gear and a second spur gear connected to the other end of the first and second axles via a first free wheel and a second free wheel;
    whereby said first and second axles are guided circumferentially in fixed grooved rings;
    whereby said first and second free wheels are arranged so as to work in opposite directions;
    whereby said first spur gear permanently engages a first transfer gear secured on a first transfer axle to transmit torque to one element of an epicyclic gear train;
    whereby said second spur gear permanently engages a second transfer gear secured on a second transfer axle to transmit torque to another element of said epicyclic gear train;
    an output axle permanently connected to a remaining element of said epicyclic gear train for receiving modified torque;
    whereby said first and second transfer axles are arranged concentrically to one another and are coaxial to said output axle; and
    a control lever connecting said input axle and said intermediate axle whereby a displacement of said control lever forces said first and second axles to displace along said radial slots thereby modifying the relative positions between said first and second axles and changing the axis of said intermediate axle from a coaxial position to an eccentric position with respect to said first and second transfer axles.

2. The application of the mechanisms stemming from this invention according to claim 1 to any type of self-propelled vehicle.

3. A continuously variable transmission system, comprising
    a housing;
    an input axle fixed to the housing, receiving input power from a power source;
    an input gear fixed on the input axle;
    an intermediate gear engaged with the input gear, the intermediate gear having radial slots;
    an intermediate axle on which the intermediate gear is concentrically fixed;
    a first set of axles and a second set of axles crossing the radial slots; and
    a control lever connecting the input axle and the intermediate axle, wherein
    a displacement of the control lever forces the first set of axles and the second set of axles to displace along the radial slots, thereby modifying the relative positions between the first set of axles and the second set of axles, and changing the axis of the intermediate axle from a coaxial position to an eccentric position.

4. The continuously variable transmission system described in claim 3, further comprising:
    a ring gear connected to the housing, which engages front ends of the first set of axles and the second set of axles.

5. The continuously variable transmission system described in claim 4, further comprising:
    attaching gears, through which the front ends of the first set of axles and the second set of axles are engaged to the ring gear.

6. The continuously variable transmission system described in claim 3, further comprising:
    a first set of spur gears and a second set of spur gears, which engages rear ends of the first set of axles and the second set of axles.

7. The continuously variable transmission system described in claim 6, further comprising:
    a first set of free wheels and a second set of free wheels, through which the first set of spur gears and the second set of spur gears are connected to the rear ends of the first set of axles and the second set of axles.

8. The continuously variable transmission system described in claims 7, wherein
    the first set of free wheels and the second set of free wheels are arranged so as to work in opposite directions.

9. The continuously variable transmission system described in claim 6, further comprising:
    a first transfer gear permanently engaged with the first spur gear; and
    a first transfer axle to transmit torque to a first element of an epicyclic gear train, wherein the first transfer gear is secured on the first transfer axle.

10. The continuously variable transmission system described in claim 9, further comprising:

a second transfer gear permanently engaged with the second spur gear; and a second transfer axle to transmit torque to a second element of the epicyclic gear train, wherein the second transfer gear is secured on the second transfer axle.

11. The continuously variable transmission system described in claim 10, further comprising an output axle permanently connected to a third element of the epicyclic gear train for receiving modified torque.

12. The continuously variable transmission system described in claim 11, wherein the first transfer axle and the second transfer axle are arranged concentrically to one another and coaxial to the output axle.

13. The continuously variable transmission system described in claim 3, wherein the first set of axles and the second set of axles are guided circumferentially in fixed grooved rings.

14. A continuously variable transmission system, comprising a housing;

an input axle fixed to the housing, receiving input power from a power source;

an input gear fixed on the input axle;

a first set of axles and a second set of axles;

an intermediate gear engaged with the input gear, the intermediate gear having a mechanism to adapt the first set of axles and the second set of axles;

an intermediate axle on which the intermediate gear is concentrically fixed; and a control lever connecting the input axle and the intermediate axle, wherein a displacement of the control lever forces the first set of axles and the second set of axles to displace along the mechanism in the intermediate gear, thereby modifying the relative positions between the first set of axles and the second set of axles, and changing the axis of the intermediate axle from a coaxial position to an eccentric position.

15. A continuously variable transmission system according to claim 14, wherein the mechanism in the intermediate gear comprising a series of radial slots around the intermediate gear.

16. A continuously variable transmission system according to claim 14, wherein the mechanism in the intermediate gear comprising a cross member having slots; and attachment members fixed to the intermediate gear, the attachment members are adapted to move along the slots in the cross member.

17. A continuously variable transmission system according to claim 14, wherein the mechanism in the intermediate gear comprising a cross member; and transitional pairs which revolve with a fixed transmission radio with respect to rotational movement of the input axle.

* * * * *